United States Patent
Hikita et al.

(10) Patent No.: US 7,995,895 B2
(45) Date of Patent: Aug. 9, 2011

(54) RESIN COMPOSITION FOR OPTICAL WAVEGUIDE, AND OPTICAL WAVEGUIDE PRODUCED BY EMPLOYING THE RESIN COMPOSITION

(75) Inventors: Takami Hikita, Ibaraki (JP); Yusuke Shimizu, Ibaraki (JP); Kazuo Ishihara, Tokyo (JP)

(73) Assignees: Nitto Denko Corporation, Ibaraki-shi, Osaka (JP); Nippon Steel Chemical Co., Ltd., Tokyo (JP)

( * ) Notice: Subject to any disclaimer, the term of this patent is extended or adjusted under 35 U.S.C. 154(b) by 168 days.

(21) Appl. No.: 12/496,088

(22) Filed: Jul. 1, 2009

(65) Prior Publication Data

US 2010/0003004 A1    Jan. 7, 2010

(30) Foreign Application Priority Data

Jul. 1, 2008   (JP) .................................. 2008-172397
Jun. 5, 2009   (JP) .................................. 2009-136445

(51) Int. Cl.
*G02B 6/00*   (2006.01)

(52) U.S. Cl. ........... 385/141; 385/143; 385/145; 430/56
(58) Field of Classification Search ........................ None
See application file for complete search history.

(56) References Cited

U.S. PATENT DOCUMENTS 6,611,651 B1   8/2003   Ogawa et al.

FOREIGN PATENT DOCUMENTS

| JP | 2003-147045 A | 5/2003 |
|---|---|---|
| JP | 2004-10849 A | 1/2004 |
| JP | 2005-225964 A | 8/2005 |

OTHER PUBLICATIONS

European Search Report dated Oct. 29, 2009, issued in corresponding European Patent Application No. 09164105.0.

*Primary Examiner* — Charlie Peng
*Assistant Examiner* — Mary A El-Shammaa
(74) *Attorney, Agent, or Firm* — Westerman, Hattori, Daniels & Adrian, LLP

(57) ABSTRACT

A resin composition for an optical waveguide is provided, which comprises: an epoxy compound represented by the following general formula (1):

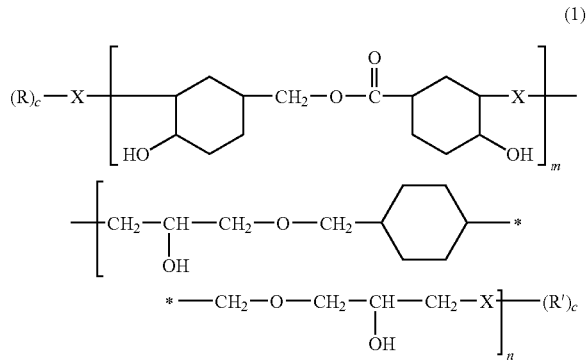

wherein m is 1 or a positive integer, n is 1 or a positive integer, R and R' which may be the same or different are each represented by the following formula (2) or (3), wherein c is a positive integer of 1 to 3 and each one of c may be the same or different, and X is represented by the following formula (4):

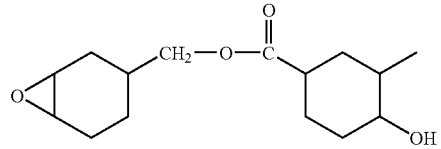
(2)

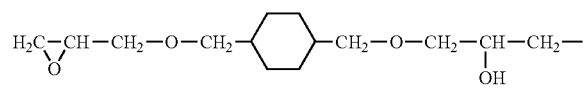
(3)

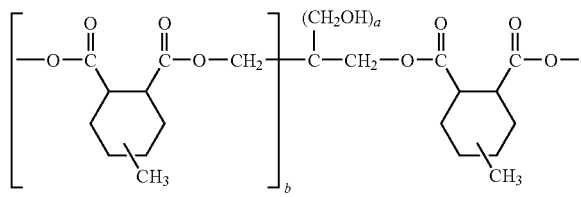
-continued
(4)

wherein a is an integer of 0 to 2, and b is a positive integer of 1 to 3, and satisfy a condition of a+b=3; and a photoacid generator. The resin composition has a lower viscosity, and is excellent in flexibility and moisture absorption resistance. An optical waveguide produced by employing the resin composition is also provided.

6 Claims, 4 Drawing Sheets

RESIN COMPOSITION FOR OPTICAL WAVEGUIDE, AND OPTICAL WAVEGUIDE PRODUCED BY EMPLOYING THE RESIN COMPOSITION

BACKGROUND OF THE INVENTION

1. Field of the Invention

The present invention relates to a resin composition to be used as a material for an optical waveguide component, and to an optical waveguide produced by employing the resin composition. The resin composition for the optical waveguide is excellent in flexibility and moisture absorption resistance. The optical waveguide produced by employing the resin composition is used, for example, for mobile devices such as mobile phones.

2. Description of the Related Art

Optical waveguides are generally incorporated in optical devices such as optical waveguide devices, optical integrated circuits and optical wiring boards, and widely used in optical communications, optical information processing and other general optics. Such an optical waveguide typically includes a core provided as a light passage in a predetermined pattern, and an under-cladding layer and an over-cladding layer covering the core.

Various types of materials are used for forming the core, the under-cladding layer and the over-cladding layer in predetermined patterns. For example, a specific carboxyl-containing epoxy compound, which is photo-cationically polymerizable or curable, is used as a material for the cladding layers of the optical waveguide (see, for example, JP-A-2003-147045).

Where the optical waveguide is routed through a hinge portion of a foldable mobile phone, for example, the optical waveguide is required to have bendability or flexibility. For improvement of the flexibility of the optical waveguide, a resin composition containing the epoxy compound disclosed in JP-A-2003-147045 is used as a material for at lest one of the cladding layers and the core of the optical waveguide.

Where the resin composition disclosed in JP-A-2003-147045 is used as the material for any of the aforementioned optical waveguide components, however, the resulting optical waveguide indeed has sufficient flexibility, but is highly hygroscopic. If the optical waveguide components are composed of the highly hygroscopic material, the refractive indexes of the optical waveguide components will vary due to moisture absorption, resulting in greater light loss. This reduces the reliability.

In view of the foregoing, it is an object of the present invention to provide a resin composition which is excellent in flexibility and moisture absorption resistance and has a lower viscosity for use as a material for an optical waveguide, and to provide an optical waveguide produced by employing the resin composition.

SUMMARY OF THE INVENTION

According to a first aspect of the present invention to achieve the aforementioned object, there is provided a resin composition for an optical waveguide, the resin composition comprising:

an epoxy compound represented by the following general formula (1):

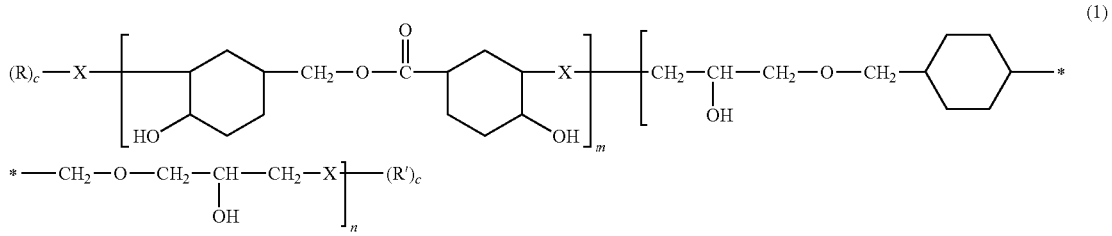

wherein m is 0 or a positive integer, n is 0 or a positive integer, R and R' which may be the same or different are each represented by the following formula (2) or (3), wherein c is a positive integer of 1 to 3 and each one of c may be the same or different, and X is represented by the following formula (4):

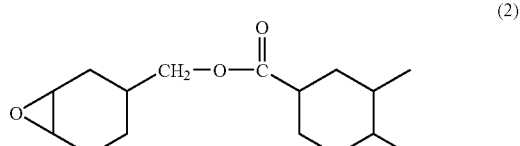

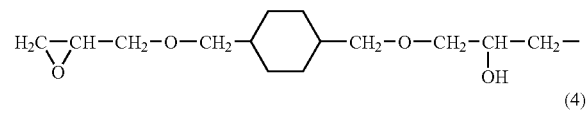

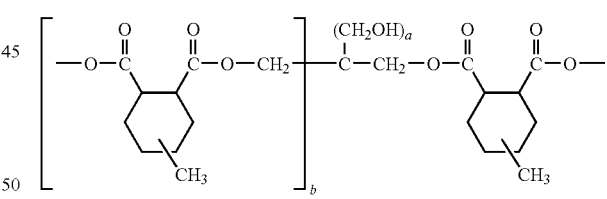

wherein a is an integer of 0 to 2, and b is a positive integer of 1 to 3, and satisfy a condition of a+b=3; and a photoacid generator.

According to a second aspect of the present invention, there is provided an optical waveguide, which includes a substrate, a cladding layer provided on the substrate, and a core provided in a predetermined pattern in the cladding layer for transmission of an optical signal, wherein at least one of the cladding layer and the core is composed of the resin composition according to the first inventive aspect.

Inventors of the present invention conducted intensive studies to provide a resin composition to be employed as a material for an optical waveguide component. The inventors synthesized a variety of compounds each having a specific molecular structure. As a result, the inventors found that, where the aforementioned novel epoxy compound having a specific molecular structure represented by the general formula (1) is used as a constituent of a resin composition for an optical waveguide, the resin composition has a lower viscosity and the optical waveguide is excellent in flexibility and moisture absorption resistance. Thus, the inventors achieved the aforementioned object, and attained the present invention. More specifically, the aforementioned novel epoxy compound has both a primary hydroxyl group and an epoxy group in its molecule and, therefore, has higher photo-curability. In addition, these functional groups each serve as a crosslinking site, so that the resulting cured product has higher heat resistance. The epoxy compound is provided in a liquid form, so that the resin composition including the epoxy compound has a viscosity suitable for coating. Further, the resulting cured product has a wider molecular weight distribution and, therefore, is highly flexible. Thus, the resin composition has a reduced viscosity, and the optical waveguide is satisfactory in flexibility and moisture absorption resistance. Thus, the inventors attained the present invention.

The inventive resin composition for the optical waveguide contains the specific epoxy compound represented by the aforementioned general formula (1), and the photoacid generator. Therefore, the resin composition has a lower viscosity. Where the resin composition is used as a material for the optical waveguide, the optical waveguide is excellent in flexibility and moisture absorption resistance. Therefore, the resin composition is useful as a material for the optical waveguide, which is highly reliable with a reduced light loss.

Since at least one of the cladding layer and the core of the optical waveguide is composed of the resin composition, the optical waveguide is flexible and resistant to moisture absorption. Therefore, the optical waveguide is highly reliable with a reduced light loss.

DETAILED DESCRIPTION OF PREFERRED EMBODIMENTS

Figure 1:
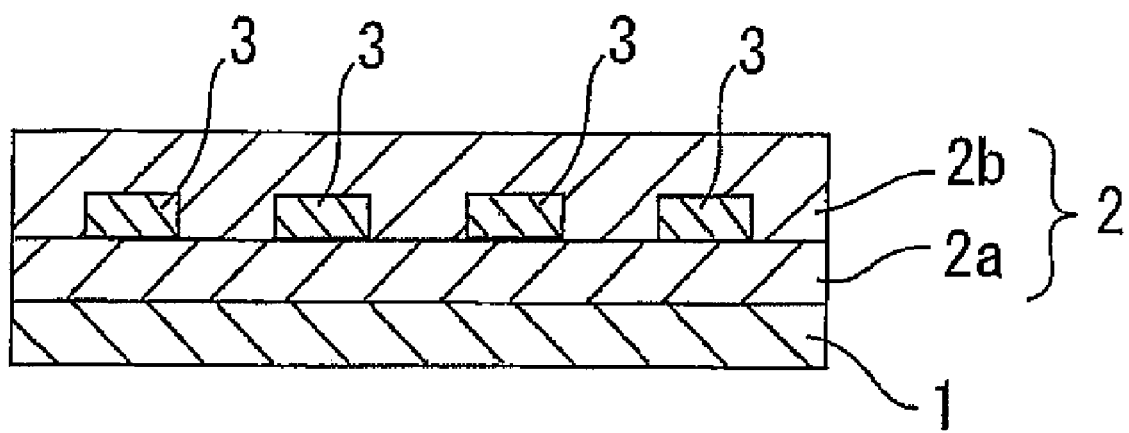
FIG. 1 is a cross sectional view illustrating an exemplary optical waveguide according to the present invention.

The present invention will hereinafter be described by way of embodiments thereof.

A resin composition for an optical waveguide according to the present invention is prepared by employing an epoxy compound having a specific molecular structure, and a photoacid generator.

The specific epoxy compound is represented by the following general formula (1):

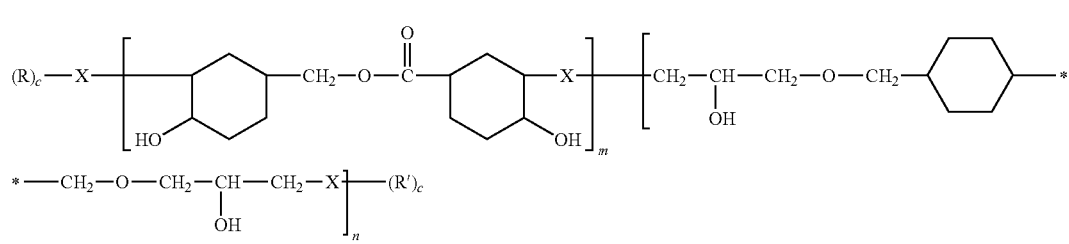

wherein m is 0 or a positive integer, n is 0 or a positive integer, R and R' which may be the same or different are each represented by the following formula (2) or (3), wherein c is a positive integer of 1 to 3 and each one of c may be the same or different, and X is represented by the following formula (4):

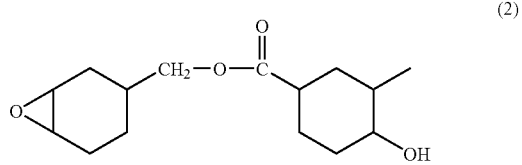

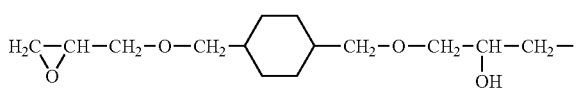

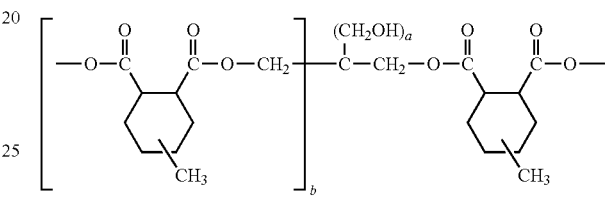

wherein a is an integer of 0 to 2, and b is a positive integer of 1 to 3, and satisfy a condition of a+b=3; and a photoacid generator.

It is particularly preferred that repetition numbers m, n are each 0 to 2000 and the sum m+n of the repetition numbers m, n is 1 to 2000 in the general formula (1). If the sum m+n is greater than 2000, the epoxy compound has an excessively high viscosity. If the epoxy compound has no molecular weight distribution with m and n being 0, the epoxy compound is unsatisfactory in flexibility. Where the epoxy compound has a molecular weight distribution with the sum n+m being in the range of 0 to 2000, the epoxy composition is satisfactory in both flexibility and viscosity.

The epoxy compound having the specific molecular structure represented by the general formula (1) is prepared, for example, in the following manner. A compound having a primary hydroxyl group and a carboxyl group is first prepared by allowing pentaerythritol to react with a methylated hexahydrophthalic anhydride, and then allowed to react with an alicyclic epoxy resin.

For the reaction of pentaerythritol with the methylated hexahydrophthalic anhydride, acid anhydride groups of the methylated hexahydrophthalic anhydride are preferably present in a proportion of less than 1.0 mol per 1.0 mol of primary hydroxyl groups of pentaerythritol. If the proportion of the acid anhydride groups of the methylated hexahydrophthalic anhydride is not less than 1.0 mol, no primary hydroxyl group remains, but the acid anhydride remains unreacted. Therefore, the resulting product is liable to be gelatinized during the subsequent reaction with the alicyclic epoxy resin.

The reaction of pentaerythritol with the methylated hexahydrophthalic anhydride is facilitated by heating a reaction system and, as required, using a catalyst. Usable examples of the catalyst include phosphine compounds, phosphonium salt compounds and imidazole compounds. A temperature for the heating is preferably, for example, in the range of 80° C. to 150° C.

Examples of the alicyclic epoxy resin for the reaction with the compound having the primary hydroxyl group and the carboxyl group include 3',4'-epoxycyclohexylmethyl-3,4-epoxycyclohexane carboxylate which is an alicyclic epoxy resin (CELLOXIDE 2021P manufactured by Daicel Chemical Industries, Ltd.) and 1,4-bis(glycidyloxymethy)cyclohexane (e.g., ZX-1658 available from Tohto Kasei Co., Ltd.) The ratio of the reactants is properly adjusted according to the heat resistance and the viscosity of the composition to impart the composition with desired physical properties (heat resistance, viscosity and the like).

The reaction of the compound having the primary hydroxyl group and the carboxyl group with the alicyclic epoxy resin is facilitated by heating and, as required, using a catalyst. Usable examples of the catalyst include phosphine compounds, phosphonium salt compounds and imidazole compounds. A temperature for the heating is preferably in the range of 100° C. to 180° C. The degree of the reaction is determined by determining the amount of residual carboxyl groups based on measurement of an acid value. The termination of the reaction is determined by detecting that the acid value is reduced to not greater than 1.0 mg KOH/g, preferably not greater than 0.5 mg KOH/g.

The epoxy compound represented by the general formula (1) preferably has an epoxy equivalent of 190 to 500 g/eq, more preferably 200 to 300 g/eq. The epoxy compound is provided in a liquid form, and preferably has a viscosity of 10 to 1000 Pa·s, more preferably 100 to 800 Pa·s, as measured at 25° C. by means of an E-type viscometer.

Where the resin composition is used as a material for an optical waveguide to be described later, at least one of a cladding layer and a core of the optical waveguide is preferably composed of a resin composition containing the epoxy compound represented by the general formula (1) and a compound having an epoxy group or a vinyl ether group. In this case, the resin composition has an improved photosensitivity, and the resulting cured product is excellent in heat resistance and moisture absorption resistance. The specific epoxy compound represented by the general formula (1) is present in the resin composition in a proportion of 10 to 40 wt %, particularly preferably 20 to 35 wt %, based on the overall weight of the resin composition. If the proportion of the epoxy compound is too small, it is difficult to produce an optical waveguide excellent in flexibility and absorption resistance. If the proportion of the epoxy compound is too great, the optical waveguide is unlikely to have heat resistance.

Usable as the epoxy-containing compound are those compatible with the specific epoxy compound represented by the general formula (1). Specific examples of the epoxy-containing compound include: phenyl glycidyl ether and butyl glycidyl ether, which each have a single epoxy group in a molecule thereof; bisphenol-A diglycidyl ether, bisphenoxyethanolfluorene diglycidyl ether, trimethylolpropane triglycidyl ether and bisphenolfluorene tetraglycidyl ether, which each have two epoxy groups in a molecule thereof; and 3'4'-epoxycyclohexylmethyl-3,4-epoxycyclohexane carboxylate and an adduct of 2,2-bis(hydroxymethyl)-1-butanol with 1,2-epoxy-4-(2-oxysilanyl)cyclohexane, which each have an alicyclic epoxy group.

Usable as the vinyl ether-containing compound are those compatible with the epoxy compound represented by the general formula (1). Specific examples of the vinyl ether-containing compound include: hydroxyethyl vinyl ether, hydroxybutyl vinyl ether and dodecyl vinyl ether, which each have a single vinyl ether group; and cyclohexanedimethanol divinyl ether, triethylene glycol divinyl ether and novolak divinyl ether, which each have two vinyl ether groups. These compounds may be used either alone or in combination.

Where the specific epoxy compound represented by the general formula (1) is used for the optical waveguide, the photoacid generator is employed to impart the resin composition with UV-curability.

Examples of the photoacid generator include aromatic diazonium salts, aromatic sulfonium salts, aromatic iodonium salts, aromatic sulfoxonium salts, methalocene compounds and iron arene compounds, among which the aromatic sulfonium salts are preferred for photo-curability and adhesiveness. In addition to the photoacid generator, an additive such as a photo-sensitizer and an acid proliferating agent may be added to the resin composition as required. The photoacid generator is preferably present in the resin composition in a proportion of 0.1 to 10 parts by weight, more preferably 0.5 to 5 parts by weight, based on 100 parts by weight of the resin component.

As required, a silane or titanium coupling agent for improvement of adhesiveness, a flexibility imparting compound such as an olefin oligomer, a norbornene polymer or other cycloolefin oligomer or polymer, a synthetic rubber or a silicone compound, an antioxidant and/or a defoaming agent may be added to the inventive resin composition, as long as the effects of the present invention are not impaired.

The resin composition may be provided in the form of a varnish, which is prepared by dissolving and mixing the aforementioned ingredients in a solvent, as long as the excellent effects of the present invention are not impaired. Examples of the solvent include methyl ethyl ketone, cyclohexanone, ethyl lactate, 2-butanone, N,N-dimethylacetamide, diglyme, diethylene glycol methyl ethyl ether, propylene glycol methyl acetate, propylene glycol monomethyl ether, tetramethylfurane, dimethoxyethane and ethyl lactate, which may be used either alone or in combination in a proper amount to impart the resin composition with a viscosity suitable for coating.

Next, an optical waveguide produced by employing the inventive resin composition will be described.

According to the present invention, as shown in FIG. 1, the optical waveguide includes a substrate 1, a cladding layer 2 (an under-cladding layer 2a and an over-cladding layer 2b) provided on the substrate 1, and a core 3 provided in a predetermined pattern in the cladding layer 2 for transmitting an optical signal. In the optical waveguide, at least one of the cladding layer 2 and the core 3 is composed of the resin composition containing the specific epoxy compound and the photoacid generator. In this case, the optical waveguide is excellent in flexibility and moisture absorption resistance. Particularly, the inventive resin composition is preferably used as a material for the cladding layer 2 for more excellent flexibility and moisture absorption resistance. In the inventive optical waveguide, the cladding layer 2 is required to have a smaller refractive index than the core 3.

Figure 2A:
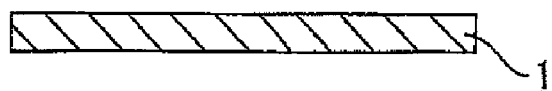
FIGS. 2A to 2F are diagrams for explaining a process for producing the inventive optical waveguide.
Figure 2B:
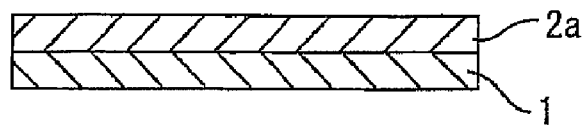
Figure 2C:
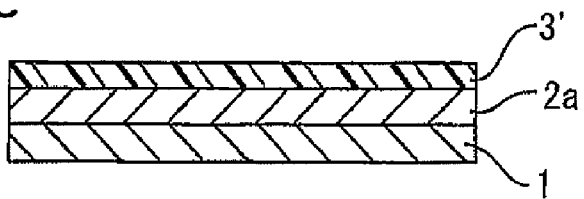
Figure 2D:
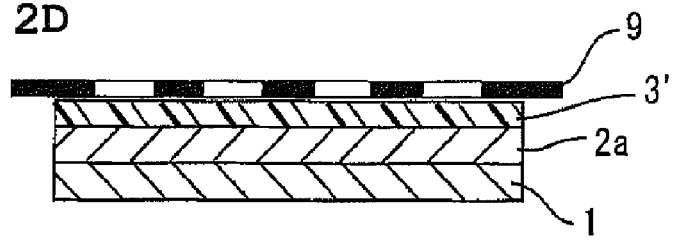
Figure 2E:
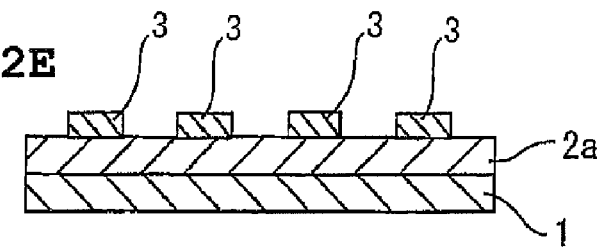
Figure 2F:
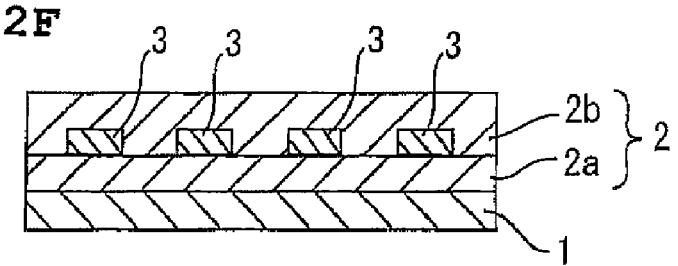

In the present invention, the optical waveguide is produced in the following manner as shown in FIGS. 2A to 2F. First, a substrate 1 is prepared as shown in FIG. 2A. Then, an under-cladding layer 2a (a lower portion of the cladding layer 2) is formed, as shown in FIG. 2B, by applying the inventive resin composition on a surface of the substrate 1, irradiating the resulting resin composition layer with ultraviolet radiation and heating the resin composition layer. In turn, as shown in FIG. 2C, a core formation resin composition is applied on the under-cladding layer 2a to form a resin composition layer 3'. Subsequently, as shown in FIG. 2D, a photomask 9 is placed on a surface of the resin composition layer 3', which is in turn exposed to light such as UV radiation via the photomask 9 into a predetermined pattern (optical waveguide pattern) and heat-treated. Thereafter, an unexposed portion of the resin composition layer 3' is dissolved away with the use of a developing agent. Thus, a core 3 is formed as shown in FIG. 2E. Then, an over-cladding layer 2b (an upper portion of the cladding layer 2) is formed by applying the inventive resin composition, irradiating the resulting resin composition layer with ultraviolet radiation and heating the resin composition layer as shown in FIG. 2F. Thus, the intended optical waveguide is provided.

Exemplary materials for the substrate 1 include polymer films and glass substrates. Specific examples of the polymer films include polyethylene terephthalate (PET) films, polyethylene naphthalate films, and polyimide films. The substrate 1 typically has a thickness of 10 μm to 3 mm.

Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 mJ/cm$^2$, preferably 50 to 5000 mJ/cm$^2$, more preferably 500 to 3000 mJ/cm$^2$.

A heat treatment for completion of a photoreaction after the exposure with the ultraviolet radiation is typically performed at 80° C. to 250° C., preferably 100° C. to 150° C., for 10 seconds to 2 hours, preferably 5 minutes to 1 hour.

Where the inventive resin composition is used as the material for the cladding layer 2, the resin composition for the core 3 may be, for example, a resin composition containing the aforementioned epoxy-containing compound and the aforementioned photoacid generator. For preparation of the varnish, a proper amount of any of the aforementioned solvents is added to the resin composition, so that the resin composition has a viscosity suitable for coating.

Exemplary coating methods for the formation of the under-cladding layer 2a, the over-cladding layer 2b and the resin composition layer 3' on the substrate 1 include coating methods employing a spin coater, a coater, a disk coater and a bar coater, a screen printing method, a capillary coating method in which the resin composition is introduced into a gap formed with the use of spacers by the capillary phenomenon, and a continuous roll-to-roll coating method employing a multi-coater. The optical waveguide may be provided in the form of a film optical waveguide by removing the substrate 1. In this case, the optical waveguide is more flexible.

The optical waveguide thus produced is used for a wiring circuit to be routed through a hinge portion of a mobile device such as a mobile phone.

Next, the present invention will be described by way of examples thereof. However, it should be understood that the invention be not limited to these examples. In the examples, "part" means "part by weight", unless otherwise specified.

Prior to production of optical waveguides of the examples, novel epoxy compounds were synthesized in the following manner.

Synthesis of Epoxy Compound (B-a)

Figure 3:
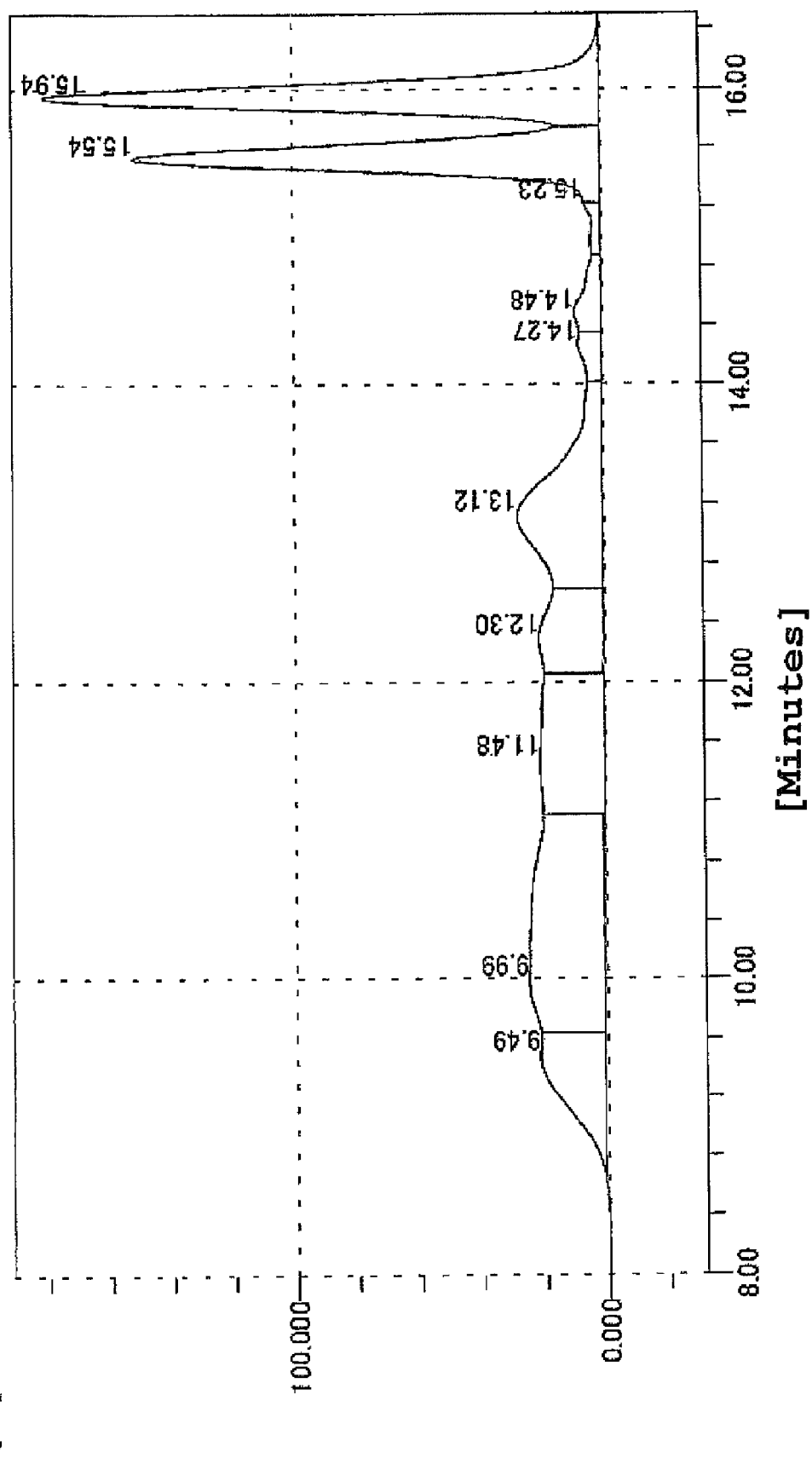
FIG. 3 is a GPC molecular weight distribution chart of an epoxy compound (B-a) prepared for examples.
Figure 4:
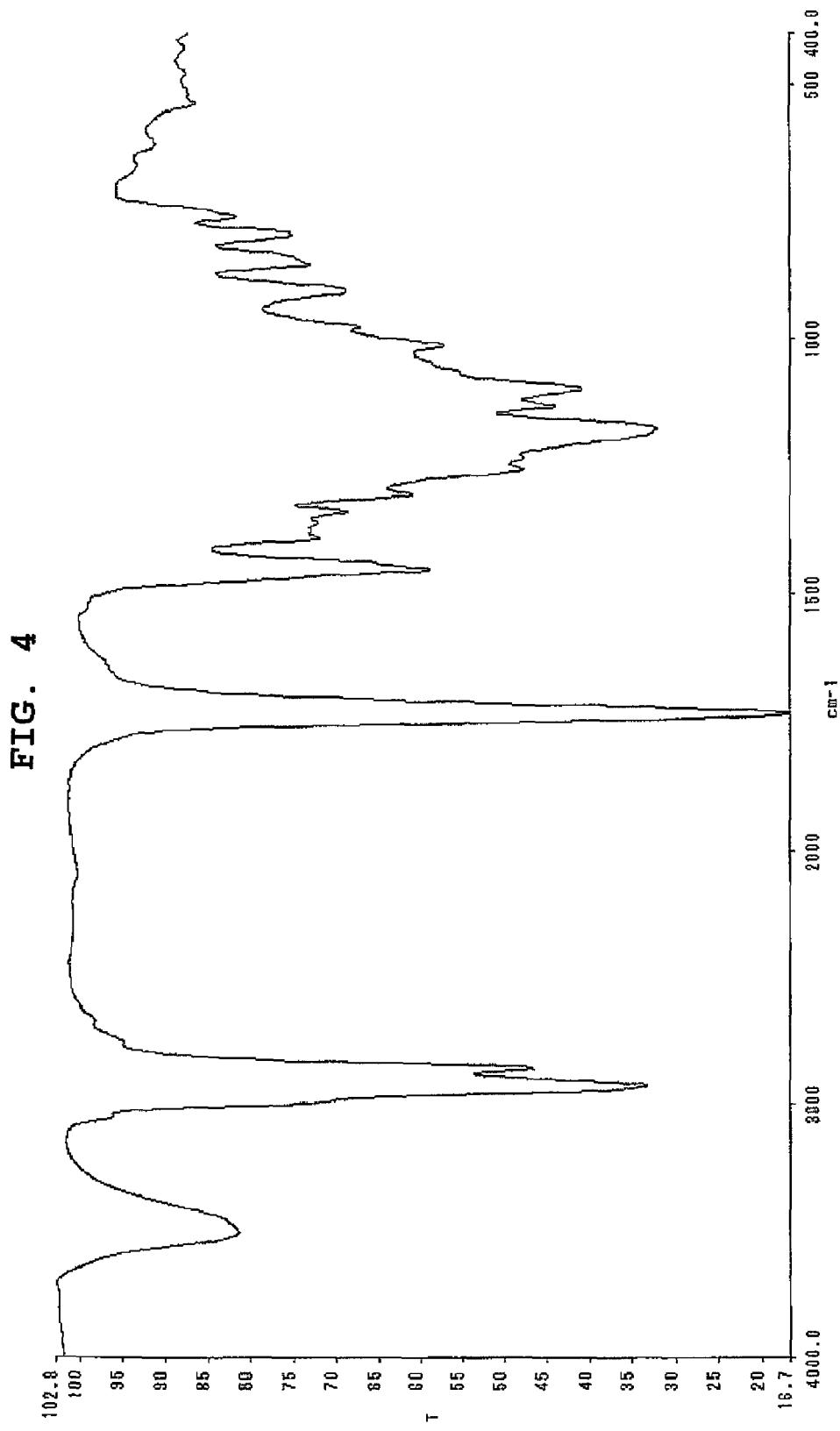
FIG. 4 is an FTIR chart of the epoxy compound (B-a) prepared for the examples.

First, 38.2 parts of pentaerythritol (available from Mitsubishi Gas Chemical Company Inc.), 160.3 parts of methyl hexahydrophthalic anhydride (RIKACID MH-700 available from New Japan Chemical Co., Ltd.) and 43.6 parts of toluene were put in a separable flask provided with a condenser, a nitrogen introduction tube and a stirrer, and heated up to 130° C. in a nitrogen gas atmosphere with stirring to be allowed to react with each other at 130° C. Then, 312.6 parts of 1,4-bis (glycidyloxymethyl)cyclohexane (an alicyclic epoxy resin ZX-1658 available from Tohto Kasei Co., Ltd.) and 489.0 parts of 3'4'-epoxycyclohexylmethyl-3,4-epoxycyclohexane carboxylate which is an alicyclic epoxy resin (CELLOXIDE 2021P manufactured by Daicel Chemical Industries, Ltd.) were added to the reaction product, and the resulting mixture was heated up to 130° C. and homogenized. In turn, 0.04 parts of n-butyltriphenylphosphonium bromide (TPP-BB available from Hokko Chemical Industry Co., Ltd.) serving as a catalyst was dissolved in acetone, and the resulting solution was added to the reaction system. The resulting mixture was subjected to a reaction at 150° C. Thus, a transparent pale yellow epoxy compound (B-a) was synthesized. The epoxy compound (B-a) had an epoxy equivalent of 224.4 g/eq, and an acid value of not greater than 0.5 mg KOH/g. The epoxy compound (B-a) had a viscosity of 290 Pa·s as measured at 25° C. by means of an E-type viscometer. The GPC (gel permeation chromatography) molecular weight distribution chart of the epoxy compound (B-a) is shown in FIG. 3, and the FTIR (Fourier transform infrared spectroscopy) chart is shown in FIG. 4. The epoxy compound (B-a) had a molecular structure represented by the general formula (1), wherein an average m:n ratio was m:n=63:37 and an average a:b ratio was a:b=15:85.

Synthesis of Epoxy Compound (B-b)

First, 38.6 parts of pentaerythritol (available from Mitsubishi Gas Chemical Company Inc.), 161.7 parts of methyl hexahydrophthalic anhydride (RIKACID MH-700 available from New Japan Chemical Co., Ltd.) and 44.0 parts of toluene were put in a separable flask provided with a condenser, a nitrogen introduction tube and a stirrer, and heated up to 130° C. in a nitrogen gas atmosphere with stirring to be allowed to react with each other at 130° C. Then, 265.0 parts of 1,4-bis (glycidyloxymethyl)cyclohexane (an alicyclic epoxy resin ZX-1658 available from Tohto Kasei Co., Ltd.) and 534.8 parts of 3'4'-epoxycyclohexylmethyl-3,4-epoxycyclohexane carboxylate which is an alicyclic epoxy resin (CELLOXIDE 2021P manufactured by Daicel Chemical Industries, Ltd.) were added to the reaction product, and the resulting mixture was heated up to 130° C. and homogenized. In turn, 0.06 parts of n-butyltriphenylphosphonium bromide (TPP-BB available from Hokko Chemical Industry Co., Ltd.) serving as a catalyst was dissolved in acetone, and the resulting solution was added to the reaction system. The resulting mixture was subjected to a reaction at 150° C. Thus, a transparent pale yellow epoxy compound (B-b) was synthesized. The epoxy compound (B-b) had an epoxy equivalent of 228.2 g/eq, and an acid value of not greater than 0.5 mg KOH/g. The epoxy compound (B-b) had a viscosity of 800 Pa·s as measured at 25° C. by means of an E-type viscometer. Like the epoxy compound (B-a), the epoxy compound (B-b) was identified based on GPC and FTIR. The epoxy compound (B-b) had a molecular structure represented by the general formula (1), wherein an average m:n ratio was m:n=68:32 and an average a:b ratio was a:b=15:85.

Synthesis of Epoxy Compound (B-c)

First, 34.6 parts of pentaerythritol (available from Mitsubishi Gas Chemical Company Inc.), 153.8 parts of methyl hexahydrophthalic anhydride (RIKACID MH-700 available from New Japan Chemical Co., Ltd.) and 52.2 parts of toluene were put in a separable flask provided with a condenser, a nitrogen introduction tube and a stirrer, and heated up to 130° C. in a nitrogen gas atmosphere with stirring to be allowed to react with each other at 130° C. Then, 304.2 parts of 1,4-bis (glycidyloxymethyl)cyclohexane (an alicyclic epoxy resin ZX-1658 available from Tohto Kasei Co., Ltd.) and 507.4 parts of 3'4'-epoxycyclohexylmethyl-3,4-epoxycyclohexane carboxylate which is an alicyclic epoxy resin (CELLOXIDE 2021P manufactured by Daicel Chemical Industries, Ltd.) were added to the reaction product, and the resulting mixture was heated up to 130° C. and homogenized. In turn, 0.04 parts of n-butyltriphenylphosphonium bromide (TPP-BB available from Hokko Chemical Industry Co., Ltd.) serving as a catalyst was dissolved in acetone, and the resulting solution was added to the reaction system. The resulting mixture was subjected to a reaction at 150° C. Thus, a transparent pale yellow epoxy compound (B-c) was synthesized. The epoxy compound (B-c) had an epoxy equivalent of 216.3 g/eq, and an acid value of not greater than 0.5 mg KOH/g. The epoxy compound (B-c) had a viscosity of 230 Pa·s as measured at 25° C. by means of an E-type viscometer. Like the epoxy compound (B-a), the epoxy compound (B-c) was identified based on GPC and FTIR. The epoxy compound (B-c) had a molecular structure represented by the general formula (1), wherein an average m:n ratio was m:n=64:36 and an average a:b ratio was a:b=10:90.

Example 1

An optical waveguide (see FIG. 1) was produced by forming an under-cladding layer, a core and an over-cladding layer in the following manner. Then, the optical waveguide was evaluated in the following manner.
Formation of Under-Cladding Layer First, a varnish (varnish (A)) for an under-cladding layer was prepared by mixing 34 parts of bisphenoxyethanolfluorene diglycidyl ether (OGSOL EG available from Osaka Gas Chemicals Co., Ltd.) (Resin (A)), 20 parts of the epoxy compound (B-a) (Resin (B-a)), 5 parts of 3'4'-epoxycyclohexyl-methyl-3,4-epoxycyclohexane carboxylate (CELLOXIDE 2021P available from Daicel Chemical Industries, Ltd.) (Resin (C)), 11 parts of an (3'4'-epoxycyclohexane)methyl-3',4'-epoxycyclohexyl-carboxylate (CELLOXIDE 2081 available from Daicel Chemical Industries, Ltd.) (Resin (D)), 30 parts of di[1-ethyl(3-oxetanyl)]methyl ether (ARON OXETANE OXT-221 available from Toagosei Co., Ltd.) (Resin (E)) and 0.5 parts of sulfonium salt photoacid generator (SP170 available from Adeka Corporation) (photosensitive agent) with stirring.

Then, a glass substrate (180 mm×180 mm×1.2 mm (thickness)) was prepared, and the varnish (A) was applied on a surface of the glass substrate by a spin coating method. In turn, the resulting coating layer was entirely irradiated with ultraviolet radiation at a dose of 2000 mJ/cm$^2$, and then heat-treated at 120° C. for 15 minutes. Thus, the under-cladding layer was formed (see FIG. 2B). The under-cladding layer had a thickness of 25 µm as measured by a contact film thickness meter. Further, the under-cladding layer had a refractive index of 1.542 at a wavelength of 830 nm.
Formation of Core A varnish (Varnish (B)) for a core was prepared by mixing 70 parts of Resin (A), 30 parts of 1,3,3-tris{4-[2-(3-oxetanyl)] butoxyphenyl}butane (Resin (F)), 1 part of the aforementioned photosensitive agent and ethyl lactate with stirring.

Then, Varnish (B) was applied on the under-cladding layer by a spin coating method, and the resulting coating layer was dried at 100° C. for 10 minutes. Thus, a core precursor layer was formed (see FIG. 2C). A synthetic quartz-based chromium mask (photomask) formed with a 50-µm wide band-shaped optical waveguide pattern was placed on the core precursor layer (see FIG. 2D). The core precursor layer was exposed to ultraviolet radiation at a dose of 2500 mJ/cm$^2$ via the chromium mask by a contact exposure method, and then heat-treated at 120° C. for 15 minutes. Subsequently, a development process was performed by using a γ-butyrolactone aqueous solution (having a concentration of 90 wt %) to dissolve away an unexposed portion, and then a heat treatment was performed at 120° C. for 15 minutes. Thus, a core pattern was formed (see FIG. 2E). The core pattern had a square sectional shape having a width of 50 µm and a height of 50 µm as measured by means of a SEM. The core thus formed had a refractive index of 1.593 at a wavelength of 830 nm.
Formation of Over-Cladding Layer Varnish (A) prepared for the under-cladding layer was applied on a surface of the under-cladding layer as covering the core by a spin coating method. In turn, the resulting coating layer was entirely irradiated with ultraviolet radiation at a dose of 2000 mJ/cm$^2$, and heat-treated at 120° C. for 15 minutes as in the formation of the under-cladding layer. Thus, an over-cladding layer was formed (see FIG. 2F). In this manner, a multimode optical waveguide having a specific refractive index Δ of 3.2% was prepared.

Example 2

An optical waveguide was produced in substantially the same manner as in Example 1, except that a cladding layer material for an under-cladding layer and an over-cladding layer was prepared by employing 30 parts of Resin (A), 25 parts of Resin (B-a), 15 parts of Resin (C), 30 parts of Resin (E) and 0.5 parts of the photosensitive agent as shown in Table 1. The under-cladding and over-cladding layers of the optical waveguide thus produced each had a refractive index of 1.539 at a wavelength of 830 nm. The optical waveguide had a specific refractive index Δ of 3.4%.

Example 3

An optical waveguide was produced in substantially the same manner as in Example 1, except that a cladding layer material for an under-cladding layer and an over-cladding layer was prepared by employing 20 parts of Resin (A), 35 parts of Resin (B-a), 15 parts of Resin (C), 30 parts of Resin (E) and 0.5 parts of the photosensitive agent as shown in Table 1. The under-cladding and over-cladding layers of the optical waveguide thus produced each had a refractive index of 1.530 at a wavelength of 830 nm. The optical waveguide had a specific refractive index Δ of 4.0%.

Example 4

An optical waveguide was produced in substantially the same manner as in Example 1, except that a cladding layer material for an under-cladding layer and an over-cladding layer was prepared by employing 35 parts of Resin (A), 10 parts of Resin (B-a), 15 parts of Resin (C), 10 parts of Resin (D), 30 parts of Resin (E) and 0.5 parts of the photosensitive agent as shown in Table 1. The under-cladding and over-cladding layers of the optical waveguide thus produced each had a refractive index of 1.540 at a wavelength of 830 nm. The optical waveguide had a specific refractive index Δ of 3.3%.

Example 5

An optical waveguide was produced in substantially the same manner as in Example 1, except that a cladding layer material for an under-cladding layer and an over-cladding layer was prepared by employing 10 parts of Resin (A), 40 parts of Resin (B-a), 15 parts of Resin (C), 5 parts of Resin (D), 30 parts of Resin (E) and 0.5 parts of the photosensitive agent as shown in Table 1. The under-cladding and over-cladding layers of the optical waveguide thus produced each had a refractive index of 1.520 at a wavelength of 830 nm. The optical waveguide had a specific refractive index Δ of 4.6%.

Example 6

An optical waveguide was produced in substantially the same manner as in Example 1, except that the epoxy compound (B-b) (Resin (B-b)) was employed instead of the epoxy compound (B-a) (Resin (B-a)) and a cladding layer material for an under-cladding layer and an over-cladding layer was prepared by employing 30 parts of Resin (A), 25 parts of Resin (B-b), 15 parts of Resin (C), 30 parts of Resin (E) and 0.5 parts of the photosensitive agent as shown in Table 1. The under-cladding and over-cladding layers of the optical waveguide thus produced each had a refractive index of 1.538 at a wavelength of 830 nm. The optical waveguide had a specific refractive index Δ of 3.5%.

Example 7

An optical waveguide was produced in substantially the same manner as in Example 1, except that the epoxy compound (B-c) (Resin (B-c)) was employed instead of the epoxy compound (B-a) (Resin (B-a)) and a cladding layer material for an under-cladding layer and an over-cladding layer was prepared by employing 30 parts of Resin (A), 25 parts of Resin (B-c), 15 parts of Resin (C), 30 parts of Resin (E) and 0.5 parts of the photosensitive agent as shown in Table 1. The under-cladding and over-cladding layers of the optical waveguide thus produced each had a refractive index of 1.536 at a wavelength of 830 nm. The optical waveguide had a specific refractive index Δ of 3.6%.

Comparative Example 1

An optical waveguide was produced in substantially the same manner as in Example 1, except that a cladding layer material for an under-cladding layer and an over-cladding layer was prepared by employing 35 parts of Resin (A), 40 parts of Resin (C), 25 parts of Resin (D) and 0.5 parts of the photosensitive agent without the use of Resin (B-a) as shown in Table 1. The under-cladding and over-cladding layers of the optical waveguide thus produced each had a refractive index of 1.542 at a wavelength of 830 nm. The optical waveguide had a specific refractive index Δ of 3.2%.

Comparative Example 2

An optical waveguide was produced in substantially the same manner as in Example 1, except that a cladding layer material for an under-cladding layer and an over-cladding layer was prepared by employing 35 parts of Resin (A), 10 parts of Resin (D), 40 parts of Resin (E), 15 parts of an aliphatic epoxy resin (EHPE 3150 available from Toagosei Co., Ltd.) (Resin (F)) and 0.5 parts of the photosensitive agent without the use of Resin (B-a) as shown in Table 1. The under-cladding and over-cladding layers of the optical waveguide thus produced each had a refractive index of 1.542 at a wavelength of 830 nm. The optical waveguide had a specific refractive index Δ of 3.2%.

The characteristic properties (moisture absorption percentage, light transmission loss and MIT folding endurance) of the optical waveguides thus produced and the physical properties (viscosity and glass transition temperature) of the resin compositions used as the cladding layer materials were determined in the following manner for evaluation. The results are shown in Table 1.

Viscosity

The viscosity was measured at 25° C. by means of an E-type viscometer (DV-I available from Brookfield Company).

Glass Transmission Temperature

The resin compositions for the cladding layers of the optical waveguides were each applied to a thickness of 30 μm on a glass substrate with the use of a spin coater. In turn, the resulting coating layer was exposed to UV radiation at a dose of 1000 mJ/cm$^2$ by means of an UV illuminator (MA-60F available from Mikasa Co., Ltd.), and heat-treated at 120° C. for 1 hour. Then, the resulting film was peeled off, and a test strip having a predetermined size was prepared from the film. With the use of a dynamic viscoelasticity meter (DMS210 available from SII Corporation), the measurement was performed on the test strip in a tensile mode at a measurement frequency of 10 Hz at a temperature increase rate of 10° C./min in a measurement temperature range of 30° C. to 250° C. Thus, a loss tangent peak temperature (tan δ) was determined as a glass transition temperature (Tg).

Moisture Absorption Percentage

A test strip was prepared in the same manner as for the determination of the glass transition temperature. After the test strip was allowed to stand at 85° C./85% RH for 100 hours, the moisture absorption percentage was determined by the Karl Fischer method.

Light Transmission Loss

The optical waveguides were each cut to a length of 10 cm by means of a dicing machine (MODEL 522 available from Disco Corporation), and subjected to an edge-dressing process. A section of the optical waveguide was observed by a length measurement microscope. As a result, it was found that the optical waveguide was an embedded-type multimode optical waveguide including an under-cladding layer having a thickness of 25 μm, a core having a size of 50 μm×50 μm and an over-cladding layer having a thickness of 75 μm. A total loss for the 10-cm long optical waveguide was determined as a light transmission loss with the use of a laser beam at a wavelength of 850 nm.

MIT Folding Endurance

An MIT folding endurance test was performed in conformity with JIS C-6471. The optical waveguide was separated from the glass substrate, and diced into a test strip (having a width of 10 mm and a length of 100 mm). The test strip was repeatedly folded under the following conditions by means of an MIT tester (available from Yashiro Kagaku Kiki Co., Ltd.) and the number of times of folding before breakage of the test strip was determined.

Curvature radius: 3 mm

Vibration speed: 120/min

Load: 100 g

Folding angle: ±135 degrees

TABLE 1

|  | Example | | | | | | | Comparative Example | |
|---|---|---|---|---|---|---|---|---|---|
|  | 1 | 2 | 3 | 4 | 5 | 6 | 7 | 1 | 2 |
| Cladding layer material (parts by weight) | | | | | | | | | |
| Resin (A) | 34 | 30 | 20 | 35 | 10 | 30 | 30 | 35 | 35 |
| Resin (B-a) | 20 | 25 | 35 | 10 | 40 | — | — | — | — |
| Resin (B-b) | — | — | — | — | — | 25 | — | — | — |
| Resin (B-c) | — | — | — | — | — | — | 25 | — | — |
| Resin (C) | 5 | 15 | 15 | 15 | 15 | 15 | 15 | 40 | — |
| Resin (D) | 11 | — | — | 10 | 5 | — | — | 25 | 10 |
| Resin (E) | 30 | 30 | 30 | 30 | 30 | 30 | 30 | — | 40 |
| Resin (F) | — | — | — | — | — | — | — | — | 15 |
| Photosensitive agent | 0.5 | 0.5 | 0.5 | 0.5 | 0.5 | 0.5 | 0.5 | 0.5 | 0.5 |
| Viscosity (mPa · s) | 2280 | 2100 | 1870 | 2400 | 1620 | 2700 | 1950 | 2900 | 1760 |
| Glass transition temperature (Tg, ° C.) | 110 | 108 | 114 | 115 | 132 | 112 | 110 | 128 | 110 |
| Moisture absorption percentage (%) | 1.0 | 0.9 | 1.2 | 1.1 | 1.0 | 1.0 | 1.1 | 3.0 | 0.9 |
| Light transmission loss (dB/10 cm) | 2.10 | 2.32 | 2.02 | 2.12 | 2.20 | 2.15 | 2.20 | 2.44 | 2.34 |
| MIT folding endurance (×1000) | >100 | >100 | >100 | >100 | >100 | >100 | >100 | >100 | 23 |

As can be understood from the above results, the resin compositions of Examples 1 to 7 each had advantageous physical properties, i.e., a properly reduced viscosity, a proper glass transition temperature and a lower moisture absorption percentage. The optical waveguides of Examples 1 to 7 each had a lower light transmission loss, and were excellent in flexibility because they endured more than 100,000 times of folding in the MIT folding endurance test.

In contrast, the composition of Comparative Example 1 had a higher viscosity and poorer moisture absorption resistance with a higher moisture absorption percentage, though the optical waveguide of Comparative Example 1 was satisfactory in flexibility. The resin composition of Comparative Example 2 had a lower moisture absorption percentage, but the optical waveguide of Comparative Example 2 was unsatisfactory in flexibility because it endured only 23,000 times of folding in the MIT folding endurance test.

According to the present invention, the resin composition, which contains the specific epoxy compound, is useful as a material for optical waveguide components. Further, the optical waveguide according to the present invention is useful as a signal transmission circuit to be provided in a hinge portion or a slide portion of a mobile device such as a foldable mobile phone.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A resin composition for an optical waveguide, the resin composition comprising:
    an epoxy compound represented by the following general formula (1):

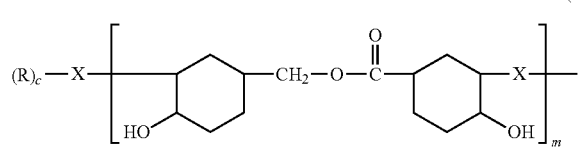

(1)

-continued

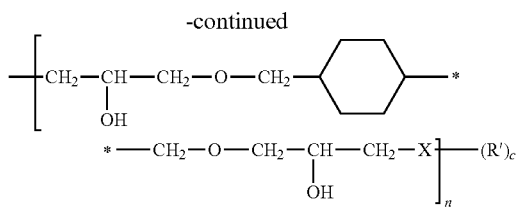

wherein m is 0 or a positive integer, n is 0 or a positive integer, R and R' which may be the same or different are each represented by the following formula (2) or (3), wherein c is a positive integer of 1 to 3 and each one of c may be the same or different, and X is represented by the following formula (4):

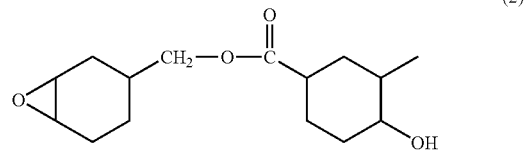

(2)

(3)

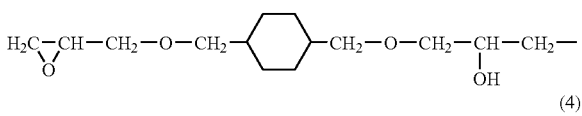

(4)

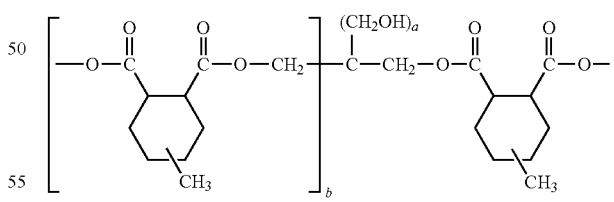

wherein a is an integer of 0 to 2, and b is a positive integer of 1 to 3, and satisfy a condition of a+b=3; and
    a photoacid generator.

2. A resin composition as set forth in claim 1, wherein the epoxy compound is present in a proportion of 10 to 40 wt % based on the weight of a resin component.

3. An optical waveguide comprising:
    a substrate;
    a cladding layer provided on the substrate; and
    a core provided in a predetermined pattern in the cladding layer for transmission of an optical signal;

wherein at least one of the cladding layer and the core is composed of a resin composition comprising:
an epoxy compound represented by the following general formula (1):

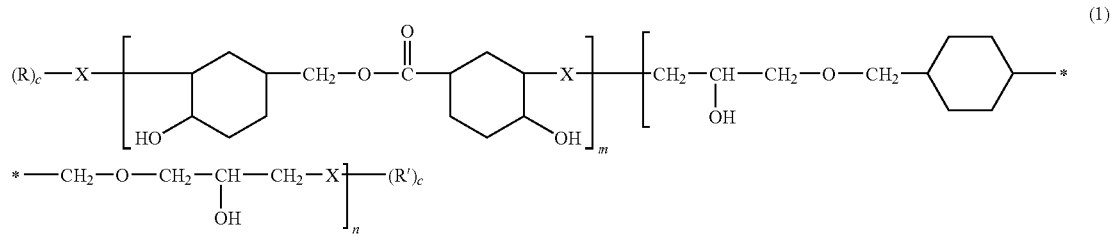

wherein m is 0 or a positive integer, n is 0 or a positive integer, R and R' which may be the same or different are each represented by the following formula (2) or (3), wherein c is a positive integer of 1 to 3 and each one of c may be the same or different, and X is represented by the following formula (4):

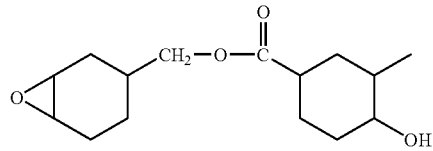

(2)

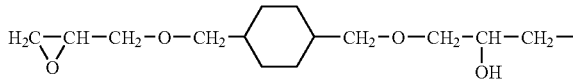

(3)

-continued

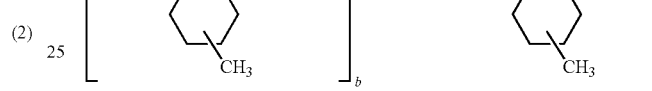

(4)

wherein a is an integer of 0 to 2, and b is a positive integer of 1 to 3, and satisfy a condition of a+b=3; and
a photoacid generator.

4. A resin composition as set forth in claim 3, wherein the epoxy compound is present in a proportion of 10 to 40 wt % based on the weight of a resin component.

5. An optical waveguide as set forth in claim 3, wherein the cladding layer is composed of the resin composition.

6. An optical waveguide as set forth in claim 4, wherein the cladding layer is composed of the resin composition.

* * * * *